(12) United States Patent
Tsuda

(10) Patent No.: US 7,852,431 B2
(45) Date of Patent: Dec. 14, 2010

(54) BACKLIGHT DEVICE

(75) Inventor: Akimitsu Tsuda, Miki (JP)

(73) Assignee: Tpo Hong Kong Holding Limited, Shatin, Hong Kong Sar (CN)

(*) Notice: Subject to any disclaimer, the term of this patent is extended or adjusted under 35 U.S.C. 154(b) by 1075 days.

(21) Appl. No.: 10/596,416

(22) PCT Filed: Dec. 8, 2004

(86) PCT No.: PCT/IB2004/052700

§ 371 (c)(1),
(2), (4) Date: Jun. 13, 2006

(87) PCT Pub. No.: WO2005/059611

PCT Pub. Date: Jun. 30, 2005

(65) Prior Publication Data

US 2008/0309848 A1 Dec. 18, 2008

(30) Foreign Application Priority Data

Dec. 15, 2003 (WO) .................... PCT/IB03/06003

(51) Int. Cl.
 *G02F 1/1335* (2006.01)
(52) U.S. Cl. ............................................ 349/61
(58) Field of Classification Search ............ None
 See application file for complete search history.

(56) References Cited

U.S. PATENT DOCUMENTS

| | | | | |
|---|---|---|---|---|
| 6,396,634 | B1 * | 5/2002 | Ishikawa et al. | 359/599 |
| 7,156,546 | B2 * | 1/2007 | Higashiyama | 362/561 |
| 2001/0001595 | A1 * | 5/2001 | Hosseini et al. | 362/31 |
| 2004/0100423 | A1 * | 5/2004 | Nagakubo et al. | 345/40 |
| 2005/0001537 | A1 * | 1/2005 | West et al. | 313/500 |
| 2006/0274226 | A1 * | 12/2006 | Im et al. | 349/71 |

FOREIGN PATENT DOCUMENTS

| | | |
|---|---|---|
| EP | 1376208 | 1/2004 |
| JP | 2002372711 | 12/2002 |
| JP | 2003-098545 | 4/2003 |
| WO | 03/029884 | 4/2003 |

OTHER PUBLICATIONS

Machine translation of JP 2001-067049.*

* cited by examiner

*Primary Examiner*—David Nelms
*Assistant Examiner*—Lucy P Chien
(74) *Attorney, Agent, or Firm*—Liu & Liu

(57) ABSTRACT

All of LEDs 12a-12d are switched on in a case of illuminating a main display 21 mainly. Thus, each LED 12a-12d has a lighting region 22a-22d respectively, thereby illuminating the main display 21 entirely. Central LEDs 12b, 12c in LEDs 12a-12d are switched on in a case of illuminating a sub-display mainly. Thus, each LEDs 12b, 12c has a lighting region 22b, 22c respectively, thereby illuminating the sub-display 21b.

17 Claims, 3 Drawing Sheets

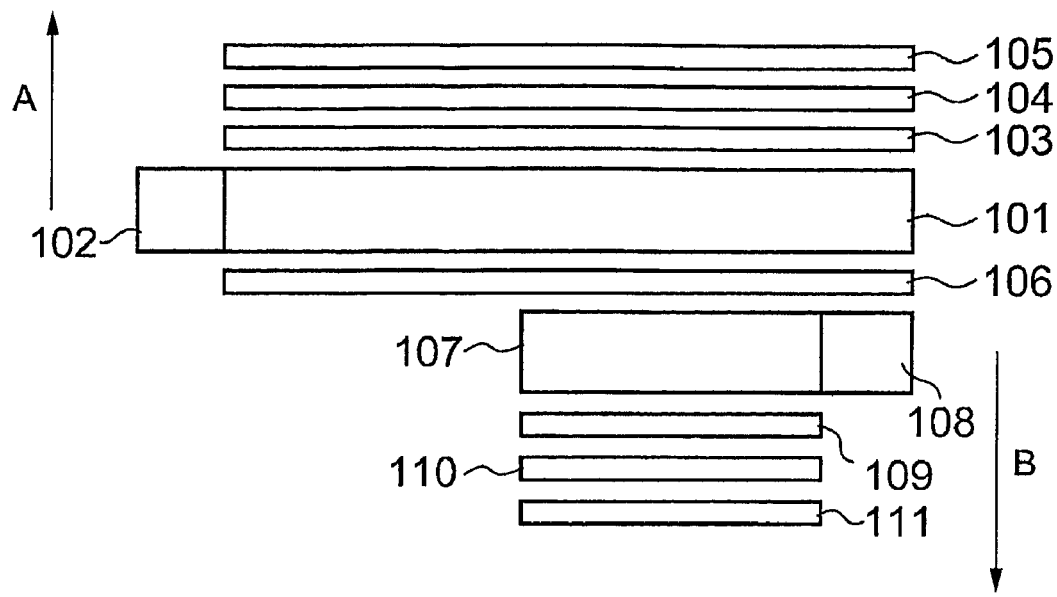
[Fig. 1] (PRIOR ART)
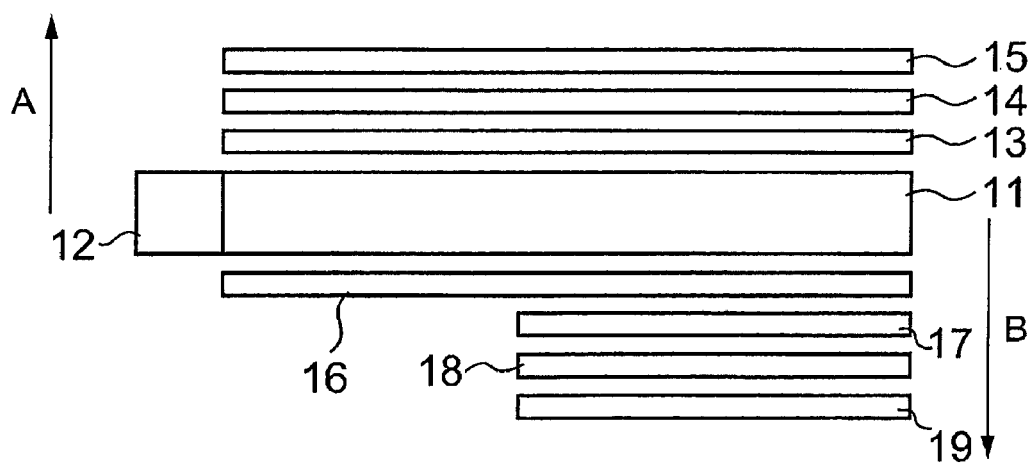
[Fig. 2]

[Fig. 3]
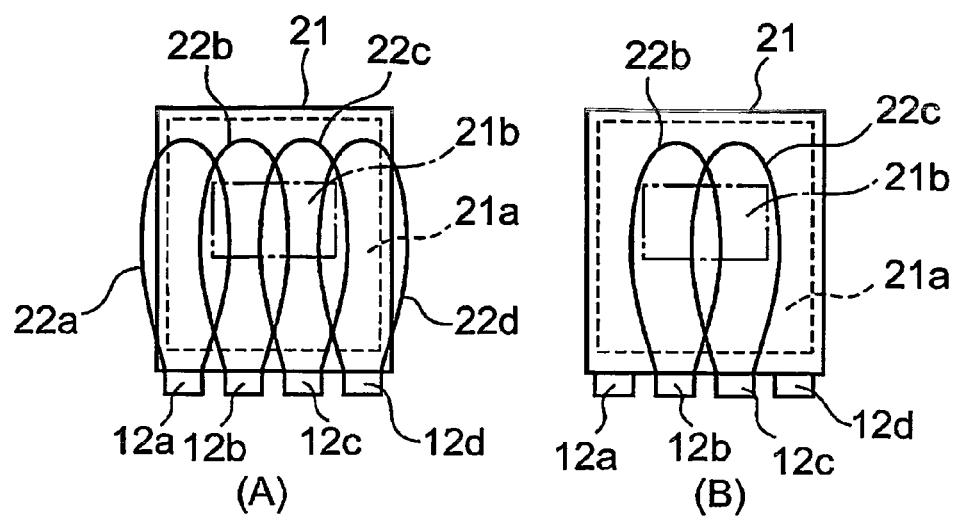
[Fig. 4]
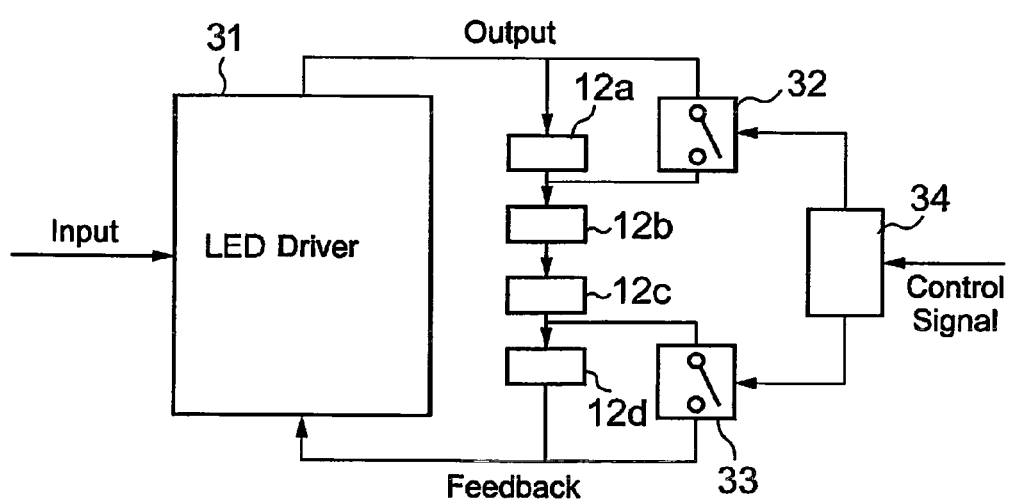

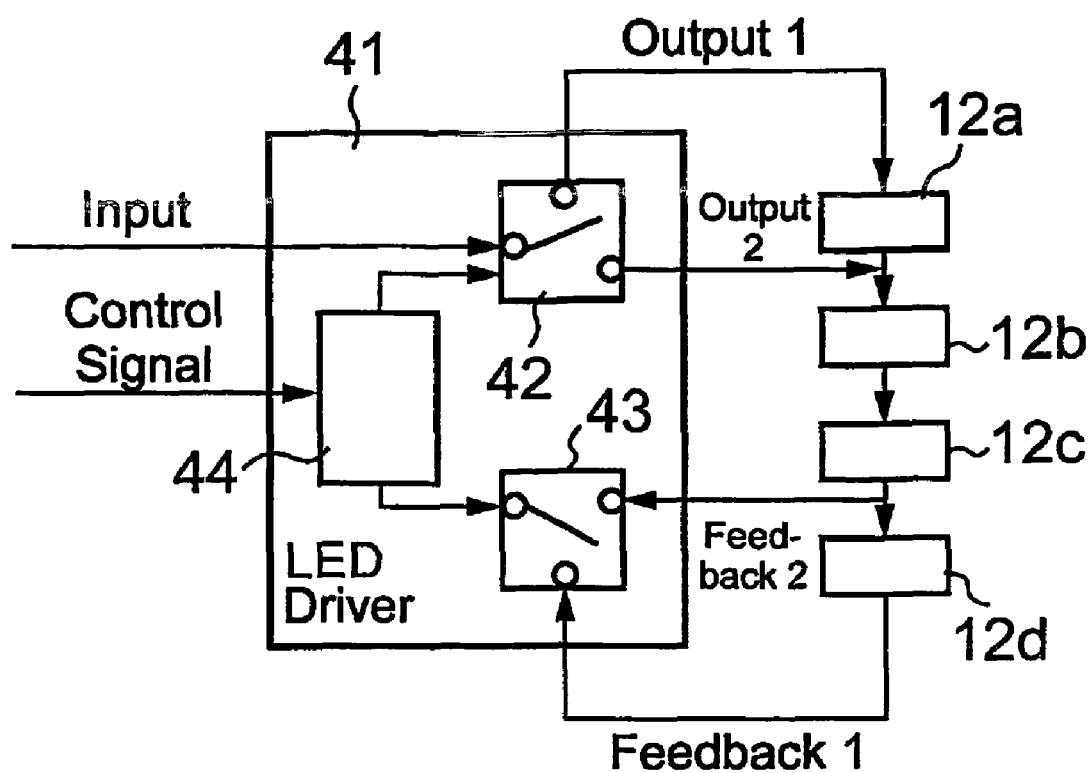
[Fig. 5]

BACKLIGHT DEVICE

TECHNICAL FIELD

The present invention relates to a backlight device used as a light source of a liquid crystal display device, and more particularly, to a double-lighting backlight device.

BACKGROUND ART

A transparent liquid crystal device or transflective liquid crystal device partially uses outside light, but mainly uses a light source which is mounted in the device. As this light source, a backlight is used.

To supply the light from the back of liquid crystal cells, this backlight is disposed on the back of the liquid crystal cells in a view from the display side of the device. This backlight is mainly constructed of light guide plates whose main surface is disposed substantially parallel to the surface on the back side of the liquid crystal cells and an edge light (side light) disposed on the edge surface side of the light guide plate for introducing light into this edge surface. Furthermore, a reflective sheet is disposed opposite the liquid crystal cell side of the light guide plate.

In such a structure, the light from the edge light propagates inside the light guide plate, and is reflected on light-emitting means provided on the light guide plate and on a reflective sheet disposed outside the light guide plate, and is redirected to the liquid crystal cells, and is then introduced into the liquid crystal cells.

Mobile phones having two displays are becoming widespread in recent years. In a case that the light is supplied to these two displays, a backlight is provided for each display.

FIG. 1 shows a structure of a conventional backlight having two displays. In the figure, reference numerals 101, 102 denote backlights for a main display (relatively large display) which supply the light in the direction indicated by arrow A. In the figure, reference numerals 107, 108 denote backlights for a sub-display (relatively small display) which supply the light in the direction indicated by arrow B.

The backlight for the main display is mainly constructed of a light guide plate 101 and an edge light (side light) disposed on one edge surface side of this light guide plate 101. As this edge light, an LED is normally used. A diffusion sheet 103 for diffusing the light emitted from the light guide plate 101 is disposed on one main surface (light-emitting surface) of the light guide plate 101.

On the diffusion sheet 103, an isotropic prism sheet 104 is disposed. As this isotropic prism sheet 104, for example, BEF (manufactured by 3M Worldwide Japan, trade name), etc., can be used. A plurality of prism-shaped protrusions are formed on the surface of this isotropic prism sheet 104 to condense the light in the direction perpendicular to the ridge lines of the protrusions.

An isotropic prism sheet 105 is disposed on the isotropic prism sheet 104. As this isotropic prism sheet 105, for example, BEF (trade name), etc., can be used. A plurality of prism-shaped protrusions are formed on the surface of this isotropic prism sheet 105 and the ridge lines of the protrusions are disposed perpendicular to the ridge lines of the protrusions of the isotropic prism sheet 104. Furthermore, this isotropic prism sheet 105 condenses the light in the direction perpendicular to the ridge lines of the protrusions.

The backlight for the sub-display is mainly constructed of a light guide plate 107 and an edge light 108 disposed on one edge surface side of this light guide plate 107. As this edge light, an LED is normally used. A diffusion sheet 109 for diffusing the light emitted from the light guide plate 107 is disposed on one main surface (light-emitting surface side) of the light guide plate 107.

An isotropic prism sheet 110 is disposed on the diffusion sheet 109. As this isotropic prism sheet 110, BEF (trade name), etc., can be used. A plurality of prism-shaped protrusions are formed on the surface of this isotropic prism sheet 110 to condense the light in the direction perpendicular to the ridge lines of the protrusions.

An isotropic prism sheet 111 is disposed on the isotropic prism sheet 110. As this isotropic prism sheet 111, BEF (trade name), etc., can be used. A plurality of prism-shaped protrusions are formed on the surface of this isotropic prism sheet 111 and the ridge lines of the protrusions are disposed perpendicular to the ridge lines of the protrusions of the isotropic prism sheet 110. Furthermore, this isotropic prism sheet 111 condenses the light in the direction perpendicular to the ridge lines of the protrusions.

A reflective plate 106 is disposed between the other main surface of the light guide plate 101 and the other main surface of the light guide plate 107. This reflective plate 106 prevents the light of the backlight on the main display side from being supplied to the sub-display side and on the contrary, prevents the light of the backlight on the sub-display side from being supplied to the main display side.

In the above described structure, it is necessary to provide the backlights 101, 102 to illuminate the main display, and the backlights 107, 108 to illuminate the sub-display respectively, which results in an increased number of parts and an increased thickness of the device as a whole.

DISCLOSURE

It is an object of the present invention to provide such a backlight device that it is possible to illuminate the respective displays efficiently and to downsize the overall device in devices having a display on both surfaces, such as mobile phones having two displays.

The backlight device according to the present invention comprises light guide means, having a pair of main surfaces faced each other and a pair of edge surfaces faced each other, for guiding the light from a light source arranged on one edge surface to both of main surfaces and control means for controlling the light source for illuminating a main lighting region having relatively large size on a side of one main surface of the light guide means, and illuminating a sub-lighting region having relatively small size on a side of another main surface of the light guide means.

Such a structure makes it possible to illuminate the respective displays efficiently and to downsize the overall device in devices having a display on both surfaces, such as mobile phones having two displays.

In the backlight device according to the present invention, the controlling means preferably comprises mode select means for selecting either a mode of illuminating the main lighting region or a mode of illuminating the sub-lighting region, and switch means for switching the power supply to the light source according to the mode selected by the mode select means.

In the backlight device according to the present invention, the switch means preferably supplies the whole light source with the electric power in the mode of illuminating the main lighting region, and supplies a part of the light source with the power in the mode of illuminating the sub-lighting region.

In the backlight device according to the present invention, the light source preferably has a plurality of LEDs arranged in parallel, the switch means supplies LEDs having higher contribution to the illumination with the electric power in the mode of lighting to the sub-lighting region.

In the backlight device according to the present invention, the LEDs having higher contribution to the illumination are preferably center-located LEDs of the plurality of LEDs arranged in parallel.

In the backlight device according to the present invention, the light guide means preferably has diffusion means and an isotropic prism member on both of the main surfaces respectively.

In the backlight device according to the present invention, the light guide means preferably has a semitransparent reflective member on the main surface of the sub-lighting region.

DESCRIPTION OF DRAWINGS

FIG. 1 shows a structure of a conventional backlight device;

FIG. 2 shows a structure of a backlight device according to an Embodiment of the present invention;

FIGS. 3A and 3B show lighting regions in the backlight device according to an Embodiment of the present invention, FIG. 3A shows a lighting region in a case of lighting the main display, and FIG. 3B shows a lighting region in a case of lighting the sub-display;

FIG. 4 shows a block diagram for the explanation of the control of the backlight device according to Embodiment 1 of the present invention; and FIG. 5 shows a block diagram for the explanation of the control of the backlight device according to Embodiment 2 of the present invention.

BEST MODE

With reference now to the attached drawings, embodiments of the present invention will be explained in detail below.

Embodiment 1

FIG. 2 shows a structure of a backlight device according to an Embodiment of the present invention. The backlight device according to the present invention is provided with a light guide plate 11 having a pair of main surfaces and a pair of edge surfaces. An edge light (side light) 12 is disposed on one edge surface side of the light guide plate 11. As this edge light, an LED is normally used.

On a main surface of a main display (relatively large display: upper part in FIG. 2) of the light guide plate 11, a diffusion sheet 13 is disposed which diffuses light from the light guide plate 11. This diffusion sheet 13 can make the backlight invisible in a view from the panel display surface. However, this diffusion sheet 13 need not be always provided.

An isotropic prism sheet 14 is disposed on the diffusion sheet 13. As this isotropic prism sheet 14, BEF (trade name), etc., can be used. A plurality of prism-shaped protrusions are formed on the surface of this isotropic prism sheet 14 to condense the light in the direction perpendicular to the ridge lines of the protrusions. This allows the isotropic prism sheet to control the light in right/left directions with respect to the traveling direction of the light from a light source (edge light). Therefore, providing this isotropic prism sheet 14 can improve the light condensing performance in right/left directions with respect to the traveling direction of the light from the light source and improve brightness.

An isotropic prism sheet 15 is disposed on the isotropic prism sheet 14. As this isotropic prism sheet 15, BEF (trade name), etc., can be used. A plurality of prism-shaped protrusions are formed on the surface of this isotropic prism sheet 15 and the ridge lines of the protrusions are disposed perpendicular to the ridge lines of the protrusions of the isotropic prism sheet 14. Furthermore, this isotropic prism sheet 15 condenses the light in the direction perpendicular to the ridge lines of the protrusions. In this way, the isotropic prism sheet controls the light in the light traveling direction from the light source (edge light). Therefore, providing this isotropic prism sheet 15 can improve the light condensing performance in the light traveling direction from the light source and improve brightness.

A semitransparent reflective plate 16 is disposed on a main surface on a sub-display (relatively small display: lower part in FIG. 2) side of the light guide plate 11. This semitransparent reflective plate 16 is a reflective plate with reflectivity and transmittance adjusted to a predetermined ratio.

A diffusion sheet 17 for diffusing the light from the light guide plate 11 is disposed on the semitransparent reflective plate 16. This diffusion sheet 17 can make the backlight invisible in a view from the panel display surface. However, this diffusion sheet 17 need not be always provided.

An isotropic prism sheet 18 is disposed on the diffusion sheet 17. As this isotropic prism sheet 18, BEF (trade name), etc., can be used. A plurality of prism-shaped protrusions are formed on the surface of this isotropic prism sheet 18 to condense the light in the direction perpendicular to the ridge lines of the protrusions. In this way, the isotropic prism sheet controls the light in right/left directions with respect to the light traveling direction from the light source. Therefore, providing this isotropic prism sheet 18 can improve the light condensing performance in the right/left direction with respect to the light traveling direction from the light source and improve brightness.

An isotropic prism sheet 19 is disposed on the isotropic prism sheet 18. As this isotropic prism sheet 19, BEF (trade name), etc., can be used. A plurality of prism-shaped protrusions are formed on the surface of this isotropic prism sheet 19 and the ridge lines of the protrusions are disposed perpendicular to the ridge lines of the protrusions of the isotropic prism sheet 18. Furthermore, this isotropic prism sheet 19 condenses the light in the direction perpendicular to the ridge lines of the protrusions. In this way, the isotropic prism sheet controls the light in the light traveling direction from the light source. Therefore, providing this isotropic prism sheet 19 can improve the light condensing performance of the light in the light traveling direction from the light source and improve brightness.

In the structure shown in FIG. 2, the isotropic prism sheets 14, 18 for condensing light in the direction perpendicular to the respective ridge lines of the protrusions are provided on the diffusion sheets 13, 17 and the isotropic prism sheets 15, 19 for condensing the light parallel to the respective ridge lines of the protrusions are provided thereon, but according to the present invention, it is also possible to provide the isotropic prism sheets 15, 19 on the diffusion sheets 13, 17 and provide the isotropic prism sheets 14, 18 thereon.

It is also possible to provide the isotropic prism sheets (not shown) on the outside isotropic prism sheets 15, 19. Combined with the isotropic prism sheets, this isotropic prism sheet can further improve the vertical brightness and the brightness in the wide view angle direction.

A liquid crystal panel for the main display (not shown) is disposed on the isotropic prism sheet 15 and a liquid crystal panel for the sub-display (not shown) is disposed on the isotropic prism sheet 19. In this way, the liquid crystal display device provided with the backlight device according to the present invention is constructed. As the liquid crystal panel, a commonly used panel can be used.

In the backlight device having such a structure, when the main display side is illuminated (direction indicated by arrow A), the light from the edge light 12 of the backlight device propagates inside the light guide plate 11, a part thereof directly goes out to the main display side and the rest of the light is reflected on the semitransparent reflective plate 16 disposed on the sub-display side of the light guide plate 11. The light reflected on the semitransparent reflective plate 16 passes through the light guide plate 11 and goes out to the main display side. The light from the light guide plate 11 is diffused by the diffusion sheet 13. The light which has passed through the diffusion sheet 13 is controlled by the isotropic prism sheet 14 so that the light condensing performance in the right/left directions (with respect to the light traveling direction from the light source) is improved. Then, the light which has passed through the isotropic prism sheet 14 is controlled by the isotropic prism sheet 15 so that the light condensing performance in the light traveling direction from the light source is improved. This improves brightness in the direction perpendicular to the main surface of the light guide plate 11. The light output in this way is introduced into the liquid crystal panel for the main display.

On the other hand, when the sub-display side is illuminated (direction indicated by arrow B), the light from the edge light 12 of the backlight device propagates inside the light guide plate 11 and a part thereof directly goes out to the sub-display side through the semitransparent reflective plate 16. The light from the light guide plate 11 is diffused by the diffusion sheet 17. The light which has passed through the diffusion sheet 17 is controlled by the isotropic prism sheet 18 so that light condensing performance in the right/left directions (with respect to the light traveling direction from the light source) through the isotropic prism sheet 18 is improved. Then, the light which has passed through the isotropic prism sheet 18 is controlled by the isotropic prism sheet 19 so that the light condensing performance in the light traveling direction from the light source is improved. This improves brightness in the direction perpendicular to the main surface of the light guide plate 11. The light output in this way is introduced into the liquid crystal panel for the sub-display.

In this way, the backlight device according to the present invention can illuminate two displays disposed on both surfaces of the light guide plate with a pair of the light guide plate and the light source, and can thereby reduce the number of parts as the backlight device and further reduce the thickness as the backlight device. Furthermore, using a pair of the light guide plate and the light source can reduce manufacturing cost, too.

Next, the control of the backlight device according to the present invention will be explained.

FIG. 3 shows a lighting region in the backlight device according to an embodiment of the present invention, FIG. 3A shows a lighting region in a case of illuminating the main display and FIG. 3B shows a lighting region in a case of illuminating the sub-display.

In FIG. 3, the edge light as the light source is constructed of four LEDs 12a to 12d arranged in parallel. FIG. 3 is a view from the main display 21. In the case of illuminating the main lighting region (area shown by dotted line) 21a, that is, when the main display is mainly illuminated, as shown in FIG. 3A, all of the LEDs 12a to 12d are switched on. At this time, the respective LEDs 12a to 12d have lighting regions 22a to 22d and in this way, the overall main display 21 can be illuminated.

On the other hand, in the case of illuminating the sub-lighting region (area shown by one-dot dashed line) 21b, that is, when the sub-display is mainly illuminated, as shown in FIG. 3B, the central LEDs 12b, 12c of the LEDs 12a to 12d are switched on. At this time, the respective LEDs 12b, 12c have their respective lighting regions 22b, 22c, and therefore it is possible to illuminate the sub-lighting region 21b. The present invention is characterized in that when the sub-lighting region 21b is illuminated, only the LED having the highest contribution to the illumination of the sub-lighting region 21b is switched on and LEDs having low contribution are turned OFF. For this reason, here, the LEDs 12b, 12c having relatively high contribution to the illumination of the sub-lighting region 21b are switched on. Therefore, according to the present invention, it is possible to selectively switch on LEDs having relatively high contribution to the illumination of the sub-lighting region.

FIG. 4 is a block diagram for the explanation of the control of the backlight device according to Embodiment 1 of the present invention. The control device which controls the backlight device is mainly constructed of an LED driver 31 which supplies the electric power to switch on the LEDs 12a to 12d, a mode switch section 34 for switching between the illumination of the main lighting region and the illumination of the sub-lighting region and switches 32, 33 which select the LEDs 12a to 12d to be switched on according to instructions from the mode switch section 34.

When the main lighting region is illuminated in such a structure, a control signal for selecting the mode is supplied to the mode switch section 34. The control signal may be come from the device or may be come from the user's input. The mode switch section 34 instructs the switches 32, 33 to light up all the LEDs 12a to 12d according to the control signal (to illuminate the main lighting region). The switches 32, 33 change their switching positions according to this instruction. Here, the switches 32, 33 are set to a disconnected position. At this time, the output from the LED driver 31 is supplied to all the LEDs 12a to 12d, and therefore the LEDs 12a to 12d are switched on and can thereby illuminate the main lighting region 21a as shown in FIG. 3A.

On the other hand, when the sub-lighting region is illuminated, a control signal to select the mode is supplied to the mode switch section 34. The mode switch section 34 instructs the switches 32, 33 to light up LEDs having low contribution to the illumination of the sub-lighting region, that is, to light up the central LEDs (LEDs 12b, 12c) according to the control signal (to illuminate the sub-lighting region). The switches 32, 33 change their switching positions according to this instruction. Here, the switches 32, 33 are set to a connected position. At this time, the output from the LED driver 31 is supplied to the LEDs 12b, 12c, and therefore only the LEDs 12b, 12c are switched on and can thereby illuminate the sub-lighting region 21b as shown in FIG. 3B.

Thus, according to the present invention, the illumination of the relatively large main lighting region and the illumination of the relatively small sub-lighting region are performed using a set of the light guide plate and the light source. In this case, the whole light source is switched on to illuminate the main lighting region and a part of the light source is switched on to illuminate the sub-lighting region. As a result, it is possible to illuminate the respective displays efficiently and to downsize the overall device in devices having the display on both surfaces, such as mobile phones having two displays.

Embodiment 2

FIG. 5 is a block diagram for the explanation of the control of the backlight device according to Embodiment 2 of the present invention. The control device for controlling the backlight device according to the present invention is provided with an LED driver 41 which supplies the electric power to light up LEDs 12a to 12d and the LED driver 41 is mainly constructed of a mode switch section 44 for switching between the illumination of a main lighting region and the illumination of a sub-lighting region and switches 42, 43 which select the LEDs 12a to 12d to be switched on according to an instruction from the mode switch section 44.

In such a structure, when the main lighting region is illuminated, a control signal for selecting the mode is supplied to the mode switch section 44. The control signal may be come from the device or may be come from the user's input. The mode switch section 44 instructs the switches 42, 43 to light up all the LEDs 12a to 12d according to the control signal (to illuminate the main lighting region). The switches 42, 43 change their switching positions according to this instruction. Here, the switch 42 is set to a position connected to an output 1 and the switch 43 is set to a position connected to a feedback 1. At this time, the output from the LED driver 41 is supplied to all the LEDs 12a to 12d, and therefore the LEDs 12a to 12d are switched on and can thereby illuminate the main lighting region 21a as shown in FIG. 3A.

On the other hand, when the sub-lighting region is illuminated, a control signal for selecting the mode is supplied to the mode switch section 44. The mode switch section 44 instructs the switches 42, 43 to light up LEDs having high contribution to the illumination of the sub-lighting region, that is, the central LEDs (LEDs 12b, 12c) according to the control signal (to illuminate the sub-lighting region). The switches 42, 43 change the switching positions according to this instruction. Here, the switch 42 is set to a position connected to an output 2 and the switch 43 is set to a position connected to a feedback 2. At this time, the output from the LED driver 41 is supplied to the LEDs 12b, 12c, and therefore only the LEDs 12b, 12c are switched on and can thereby illuminate the sub-lighting region 21b as shown in FIG. 3B.

As described above, the present invention performs the illumination of a relatively large main lighting region and the illumination of a relatively small sub-lighting region using a set of the light guide plate and the light source. In this case, for the illumination of the main lighting region, the whole light source is switched on, while for the illumination of the sub-lighting region, a part of the light source is switched on. As a result, it is possible to illuminate the respective displays efficiently and to downsize the overall device in devices having the display on both surfaces, such as mobile phones having two displays.

The present invention is not limited to Embodiments 1, 2 but can be modified in various ways. For example, Embodiments 1, 2 have described the case where there are four LEDs, but the present invention is likewise applicable to cases where three or five or more LEDs are arranged in parallel.

In Embodiments 1, 2, the diffusion sheet may not necessarily be sheet-shaped, but can take any mode such as a tabular or film shape if it can exhibit the diffusing effects. Furthermore, the shape of the isotropic prism sheet is not limited to a sheet shape if it can at least exhibit the function. Furthermore, the semitransparent reflective plate is not limited to a tabular shape and can have a sheet or film shape if it can at least exhibit the reflection effect. Furthermore, Embodiments 1, 2 have been explained where the semitransparent reflective plate is used, but the present invention is not limited to this and any plates, that can perform reflections and transmissions, can be used. Furthermore, the present invention is also applicable to a case where no semi-transparent reflective plate is used.

INDUSTRIAL APPLICABILITY

The present invention is applicable to a backlight device used as a light source of a liquid crystal display device such as a mobile phone, PDA (Personal Digital Assistant).

The invention claimed is:

1. A backlight device comprising:
    a light guide having a pair of main surfaces facing each other and a pair of edge surfaces facing each other, guiding the light from a light source arranged on one edge surface to both of main surfaces; and
    a control device controlling said light source to illuminate a main lighting region having relatively large size on a side of one main surface through said light guide, and to illuminate a sub-lighting region having relatively small size on a side of another main surface through said light guide, wherein said control device comprises mode selection switch selecting either a mode of illuminating the main lighting region or a mode of illuminating the sub-lighting region; and a power switch switching a power supply to said light source according to the mode selected by said mode selection switch, and wherein said power switch supplies whole light source with electric power in the mode of illuminating the main lighting region, and supplies a part of the light source less than the whole light source with electric power in the mode of lighting the sub-lighting region.

2. The device as claimed in claim 1, wherein said light source has a plurality of LEDs arranged in parallel along said one edge surface, said power switch supplies only some but not all of the plurality of LEDs having higher contribution to the illumination of the sub-lighting region with the electric power in the mode of illuminating the sub-lighting region.

3. The device as claimed in claim 2, wherein said LEDs having higher contribution to the illumination are center-located LEDs of the plurality of LEDs arranged in parallel.

4. The device as claimed in claim 1, wherein said light guide has a diffusion member and an isotropic prism member on both of the main surfaces respectively.

5. The device as claimed in claim 1, wherein said light guide has a semitransparent reflective member on the main surface of the sub-lighting region side.

6. A liquid crystal display device having a backlight device as claimed in claim 1.

7. A backlight device, comprising:
    a light guide having a first and second light emitting surfaces facing each other and a plurality of edge surfaces between the first and second light emitting surfaces, wherein the first light emitting surface emits light in a first lighting region that illuminates a first display, and the second light emitting surface emits light in a second lighting region that illuminates a second display, and wherein the first lighting region overlaps the second lighting region with respect to the first and second light emitting surfaces of the light guide;
    a light source positioned along one of said plurality of edge surfaces, wherein light from said light source is directed to the first lighting region and the second lighting region; and
    a controller controlling different amount of light from the light source to be emitted into the light guide, wherein the amount depends on whether light is desired to be emitted through the light guide to illuminate the first display or the second display, wherein the light source comprises a plurality of light emitting devices arranged along said one of the plurality of edge surfaces of the light guide, wherein the controller is configured to switch on a first set of a first number of light emitting devices when light is desired to be emitted through the light guide to illuminate the first display, and a second set of a second number of light emitting devices when light is desired to be emitted through the light guide to illuminate the second display, and wherein the first number and the second number are different.

8. The device as claim 7, wherein the first lighting region covers a first illumination area and the second lighting region covers a second illumination area, wherein the second illumination area is relatively smaller than the first illumination area.

9. The device as in claim 8, wherein the second illumination area overlaps entirely within the second illumination area.

10. The device as in claim 9, further comprising a semi-transparent reflective member on the second light emitting surface of the light guide, wherein the semi-transparent reflective member partially reflect back light emitted from the second light emitting surface and partially transmit light away from the second light emitting surface towards the second display.

11. The device as in claim 7, wherein the amount of light from the light source is controlled to be relatively less when light is to be emitted through the light guide to illuminate the second display.

12. The device as in claim 7, wherein the first number of light emitting devices in the first set is larger than the second number in the second set.

13. The device as in claim 7, wherein the first set of light emitting devices contribute to light to be emitted through the light guide to illuminate the first display, and the second set of light emitting devices contribute to light to be emitted through the light guide to illuminate the second display.

14. The device as in claim 13, wherein when the second set of light emitting devices are a subset within the first set of light emitting devices.

15. A display device, comprising:

a first display and a second display;

a light guide having a first and second light emitting surfaces facing each other and a plurality of edge surfaces between the first and second light emitting surfaces, wherein the first light emitting surface emits light in a first lighting region that illuminates the first display, and the second light emitting surface emits light in a second lighting region that illuminates the second display, and wherein the first lighting region overlaps the second lighting region with respect to the first and second light emitting surfaces of the light guide; and a light source positioned along one of said plurality of edge surfaces, wherein light from said light source is directed to the first lighting region and the second lighting region; and a controller different amount of light from the light source to be emitted into the light guide, wherein the amount depends on whether light is desired to be emitted through the light guide to illuminate the first display or the second display, wherein the light source comprises a plurality of light guide, wherein the controller is configured to switch on a first set of a first number of light emitting devices when light is desired to be emitted through the light guide to illuminate the first display, and a second set of a second number of light emitting devices when is desired to be emitted through the light guide to illuminate the second display, and wherein the first number and the second number are different.

16. The device as in claim 15, wherein the first lighting region covers a first illumination area and the second lighting region covers a second illumination area, wherein the second illumination area is relatively smaller than the first illumination area.

17. The device as in claim 15, wherein the amount of light from the light source is controlled to be relatively less when light is to be emitted through the light guide to illuminate the second display.

* * * * *